July 17, 1962 L. CORRSIN 3,045,178
OPERATING TIME INDICATOR
Filed Sept. 15, 1958
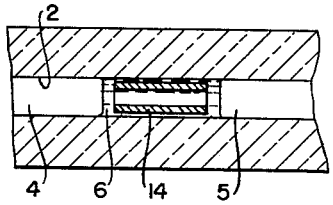
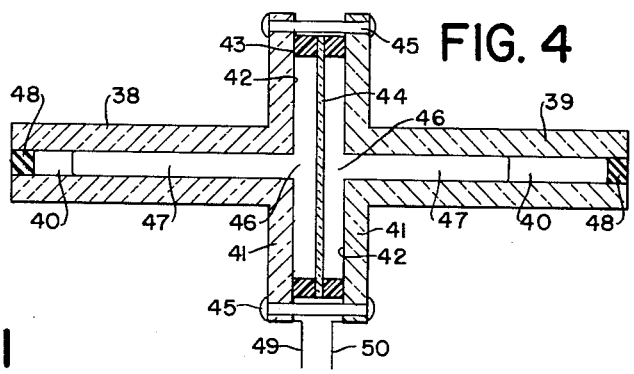
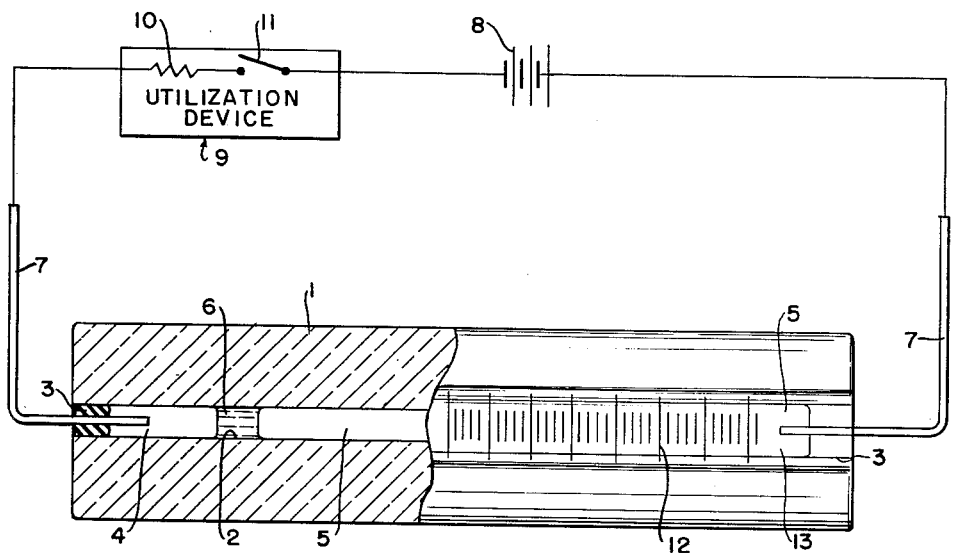
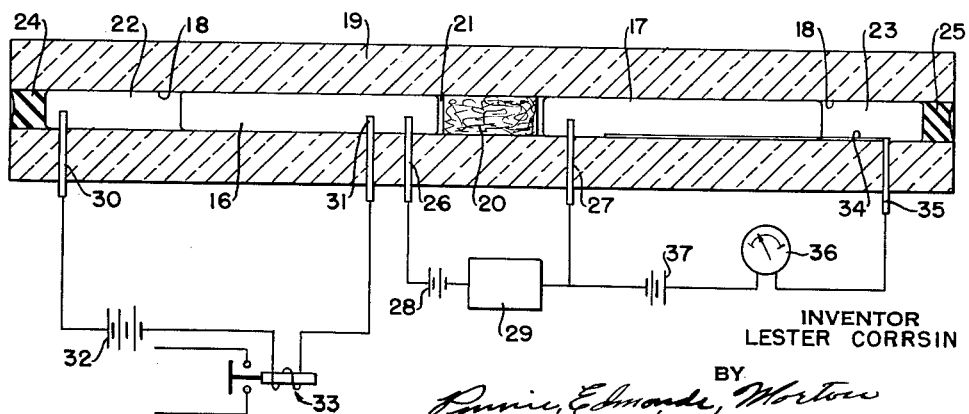
INVENTOR
LESTER CORRSIN
BY
Purvis, Edmonds, Morton
Barrows & Taylor ATTORNEYS

United States Patent Office 3,045,178
Patented July 17, 1962

3,045,178
OPERATING TIME INDICATOR
Lester Corrsin, Hartsdale, N.Y., assignor to United Nuclear Corporation, New York, N.Y., a corporation of Delaware
Filed Sept. 15, 1958, Ser. No. 760,897
17 Claims. (Cl. 324—68)

This invention relates to electrochemical devices commonly known as coulometers. More particularly, the invention provides a coulometer type instrument having an entirely novel combination and arrangement of components which give the instrument great and previously unknown utility as a current integrator. One especially useful application of the instrument is as a means for indicating the actual time that equipment has operated. The instrument may be incorporated in any form of electrical equipment which uses or can be made to yield an unidirectional current. It may also be used in conjunction with equipment of any kind which is capable of switching a simple auxiliary circuit having a direct current source.

The military services and very many industries use systems of preventive maintenance to insure reliable service from an unending variety of electrical, electronic, mechanical and hydraulic equipment, such as communications, navigation, calculating and control apparatus. These maintenance systems are nearly universally based on replacement or overhaul of entire or subassemblies of the apparatus after a predetermined number of hours of operation. Commonly, the operating time of a unit or subassembly is judged simply by elapsed calendar or clock time or by the operating time of the entire installation or vehicle in which it is used. Quite obviously, the actual operating time is not always directly releated to the operating time of the installation or vehicle. Replacement or overhaul at the times indicated by either of the approximate bases referred to may result in dangerously extending the in-service time of the apparatus or it may result in too frequent and uneconomical servicing.

To rationalize preventive maintenance systems it is necessary to know the actual time each unit of apparatus has operated. Many types of mechanical and electrical timers and operating cycle counters are presently available, but they are generally too large and expensive to be incorporated in each unit or subassembly of large installations of equipment. This is especially so in view of the current trend to miniature and subminiature equipment. There is a great need for a small and rugged, yet inexpensive, device which is easily adapted to indicate accurately the actual time apparatus has operated.

I have invented a timing device which is based on known coulometric principles but which is constructed in an entirely novel way so that it may be easily incorporated in a wide variety of equipment.

According to my invention I provide a body of non-conductive material having a bore therethrough. Within the bore itself are two columns of liquid metal, each of which extends along the bore but does not come into physical contact with the other column. The space in the bore between the adjacent ends of the liquid metal columns has an electrolyte solution therein which is in conductive contact with the adjacent or inmost ends of both columns. I also provide conductive means for connecting the columns to an external source of potential.

As will be apparent to those who are familiar with electrochemical reactions, the passage of an electric current from one metal column to the other through the electrolyte will cause metal to be transported from the end of the positive or anode column and deposited on the end of the negative or cathode column. This action occurs at a predictable rate which is dependent on the particular metal and the magnitude of the electric current. Accordingly, one column becomes longer and the other column becomes shorter in direct relation to the length of time a current of given magnitude flows through the instrument. Stated in another way the change in lengths of the columns is an analog of the integral with respect to time of the current which flows through the instrument whether the current is constant or varying.

When the instrument is to be used as a direct reading timer at least a portion of the body must be transparent so that the columns and the electrolyte may be observed. The body is provided with suitable graduations along the length of the bore so that changes in the lengths of the columns may be observed.

According to my invention as stated above particular embodiments may be arranged so that the two columns change their lengths with respect to the opposite ends of the bore as the stationary references. In such case the two liquid metal columns and the electrolyte together substantially fill the bore and the entire small volume of electrolyte is displaced along the bore as one of the columns becomes longer and its inmost end advances toward the remote end of the bore while the other column becomes shorter and its inmost end retreats. The whole small volume of electrolyte which may be made easily distinguishable from the metal columns can be observed for a gross indication of the change in length of the columns and either of the sharply defined interfaces between the electrolyte and the metal columns is an indicator for precise readings.

I have recognized and taken considerable advantage of the fact that the inevitable tendency of metal to dissolve or plate out at rates which vary widely from point to point over a metal surface which is subject to electrochemical action is very effectively overcome by the use of a liquid metal which cannot sustain an irregular and jagged surface such as would develop and become progressively worse if solid metal were used. The end surfaces of the columns of liquid metal in my new instrument retain smooth and unvarying shapes throughout the life of the instrument with the desirable result that the metal electrolyte interfaces are always sharply defined. This improves the accuracy with which the instrument may be read and eliminates the possibility of short circuits between the columns.

In another form of my invention the volume of electrolyte is held stationary by a permeable body fixed intermediate the ends of the bore. Here the combined volume of liquid metal and electrolyte is less than the volume of the bore and the two columns change their lengths with respect to the permeable body fixed in the bore as the stationary reference. In this case the remote end of one column moves away from the electrolyte in the fixed permeable body at the same time that the remote end of the other column moves toward it. This form of the invention is particularly well suited to be a combination timer or integrator and electric switch, for pairs of contact members may be placed at spaced locations along the bore on either side of the fixed permeable body so that the column of liquid metal on that side serves as a conductive member between the two contact members. Any desired external circuit may be connected to the contact members so that the instrument will open or close the circuit at times related to the spacing of the contact members and the rate of change of length of the associated column of liquid metal.

Instruments constructed according to the invention may be made very small and very rugged to the point that they are virtually shockproof and they will operate in any position. If the tubular body of a particular embodiment must be long and space considerations are especially important the tube may be coiled or spiralled in any desired manner. Coiling the tube will also improve the instrument's ability to resist shocks from all directions. The internal resistance of the device is inherently low and may be connected directly into circuits in which very low currents normally flow without imposing any substantial drain upon the circuit.

Inasmuch as the electrically effective cross-sectional areas of the columns of metal are substantially constant and the length of the current path through the columns of metal and the electrolyte does not change, the total resistance of the device remains substantially constant and therefore does not introduce a varying factor into the circuit in which it is installed.

A full description of illustrative embodiments of my invention is given below. In the course of the description reference is made to the accompanying drawings, in which:

FIG. 1 is a side elevation, partly in section, of a coulometer type elapsed time indicating device according to my invention;

FIG. 2 is a partial sectional elevation of a modification of the indicating device shown in FIG. 1; and FIG. 3 is a side elevation in section of a combined elapsed time indicator, switch and/or rheostat according to the invention; and FIG. 4 shows a modification of the instrument shown in FIG. 3.

In FIG. 1 there is shown at 1 a tube of transparent, non-conductive material such as glass, polystyrene, polymethyl methacrylate or transparent epoxy resins. This tube may be similar to that conventionally used for thermometers. The tube material is preferably one which has a cubical coefficient of thermal expansion nearly equal to that of the liquid metal to be used in the columns which are described below. This will minimize stresses in the tube material and indication errors induced by temperature changes.

A bore 2 extends from one end of the tube to the other. The bore has a substantially uniform circular cross-section throughout its length and is sealed at both ends with wax, plastic, silicate cement or metal plugs 3 or simply by heat-sealing the glass.

Prior to sealing the tube there are placed within the bore two columns 4 and 5 of liquid metal. In this embodiment the metal is mercury. As shown, each of these columns extends from one end of the tube toward the other end, but the columns do not meet. A small quantity or droplet of a suitable electrolyte solution 6 fills the space between the inmost ends of the two columns so that it is in good conductive contact with both columns. In most cases it is convenient to use enough electrolyte to make the length of the droplet in the bore from one to three times the diameter of the bore.

The electrolyte is composed of a water solution of one or more metal salts. The salt or salts are chosen so that electric current flowing from one column of metal to the other causes the mercury to be reversibly plated into and out of the solution over a range of current densities without the formation of gases or precipitates. A suitable electrolyte is a water solution of potassium iodide and mercuric iodide, the composition being 750 g. of potassium iodide per liter of water and 225 g. of mercuric iodide per liter of water.

If the instrument is to be operated at very low temperatures, up to 10 percent thallium may be added to the mercury to lower the freezing point. The freezing point of the electrolyte may likewise be lowered by adding methanol or similar miscible organic fluids to the electrolyte solution.

Although the invention is not limited to the use of a tube having a bore diameter which is small enough to intensify the capillary action, in this preferred embodiment the diameter of the bore is 3 mm. or less so that the surface tension of the mercury and of the liquid electrolyte is at least equal to, and preferably greater than, gravitational and inertial effects. This insures that the mercury columns will not flow around the electrolyte when the instrument is subjected to shock and frequent changes of position. If a liquid metal other than mercury or a liquid mixture of metals is used the bore diameter may have an optimum range which is quite different from the range for pure mercury. In any case the bore diameter should be fixed by test results for each particular application of the invention.

I have found that if the capillary tube is cleaned well before the electrolyte and the mercury are injected into the bore of the tube there is little likelihood that the electrolyte will tend to flow around the mercury columns. However, this may be easily and positively prevented by the application of a thin film of a hydrophobic organosilicon polymer such as polydimethylsiloxane resin to the wall of the bore. Because water does not wet a polymer of this kind, any tendency of the electrolyte solution to spread over the wall of the bore and around the surface of the mercury columns is prevented.

Each mercury column is provided with a conductive connection from the end of the column opposite the electrolyte to the exterior of the tube 1. Preferably, this connection is a wire 7 which extends through and is sealed into the plug 3. The sealant is preferably a plastic such as epoxy resin which is resilient enough to absorb the small differential expansion of mercury relative to glass, caused by temperature changes. Ordinarily, the very small air bubbles entrapped at the ends of the mercury columns when the tube is sealed will also act to cushion differential expansion of the materials. In the alternative, the wire 7 may be sealed into the wall of the tube adjacent the end of the tube. The wire should be stainless steel, platinum, or other material which is not soluble in mercury.

As shown in FIG. 1, the device is connected in series with a source of potential such as a battery 8 and a utilization device 9 which, for purposes of illustration, is shown simply as a resistive element 10 and a switch 11. It is assumed that the device 9 draws constant current. Thus, whenever the switch 11 is closed the current required by the device 9 also flows through the timer with the result that a quantity of mercury goes into solution with the electrolyte from one column and a like quantity goes out of solution onto the other column. The entire volume of electrolyte is displaced along the bore to a distance which is directly related to the time the current flows. Any suitable graduations 12 to facilitate the reading may be placed upon or adjacent the tube. If desired, a portion of the external surface of the tube may be formed as a cylindrical lens 13. This will facilitate reading an instrument in which the metal columns are very fine.

If the normal current drawn by the utilization device is small enough no special precautions need be taken against overheating the slender mercury columns and the electrolyte solution. If, on the other hand, the current drawn by the utilization device is large it may be necessary to use a shunt to obtain proper calibration and to reduce the current which actually flows through the instrument. Excessive current may also cause formation of gases or precipitates. Current densities on the order of 0.15 ampere per square centimeter of cross-sectional area of the columns are very satisfactory although higher or lower current densities may also be used successfully.

The full scale reading of the instrument just described is determined by the amount of current applied, the diameter of the bore and the length of the mercury columns. The wide latitude of permissible variations and combinations of these factors makes it possible to construct instruments having full scale readings which differ by many orders of magnitude. Indications within 1 percent or less of true values are easily obtained.

In FIG. 2 I have shown a modification of the elapsed time indicator illustrated in FIG. 1, the modification being particularly useful where the required capacity or proportions of the instrument dictate the use of a bore having a large volume of mercury or other liquid metal and the diameter which is greater than the maximum diameter for which capillary action obtains.

In this modification a freely movable body of electrolyte-permeable material indicated at 14 is placed in the electrolyte solution 6 between the inmost ends of the two columns of mercury 4 and 5. The movable body may be formed of any non-conductive substance having one or more passages therethrough and is so shaped and proportioned that there is no passage through the body or around it in which capillary action does not obtain. Again, the maximum dimension of the cross-section of any passage through or around this body should be 3 mm. or less.

The feature of the capillary action here is that the porous body is wetted by water solutions, such as the electrolyte solution, but is not wetted by or permeable to mercury under pressures normally encountered inside the tube. This mutual exclusion effect of the two liquids, viz., electrolyte and mercury, may be further intensified by platinizing part of the permeable member. The mercury will then wet the platinized surface and form a stable meniscus, excluding water or other solutions from that region.

In the particular embodiment shown in FIG. 2 the body of material 14 is a short length of glass tubing, the axis of which is parallel to the axis of the bore 2. The internal diameter of the tubing should be 3 mm. or less and the outside diameter should be sufficiently less than the diameter of the bore so that the tubing may be easily pushed along the bore by an advancing column of mercury.

I have also found that a cylindrical body of sintered glass particles may be used for the body 14. The numerous tortuous passages through a body of sintered glass provide continuous passages for the electrolyte, yet they are too small for the mercury to pass through.

One of the primary features of the indicating instruments shown in FIGS. 1 and 2 is that the droplet of electrolyte solution is itself the indicator and the whole droplet may be used to take gross readings. For highly accurate readings one or the other of the mercury-electrolyte interfaces may be used as the indicator. Of course, the same interface should be used consistently.

In FIG. 3 there is shown another embodiment of the invention in which there are two columns 16, 17 of liquid metal, such as mercury, within the bore 18 of a glass tube 19. In this embodiment there is a body of non-conductive, electrolyte-permeable material such as a plug 20 of sintered glass particles firmly fixed in the bore of the tube intermediate the ends thereof. The small passages through the plug 20 are filled with an electrolyte solution 21. This solution may be the potassium iodide and mercuric iodide solution described in connection with FIG. 1. To insure good conductive contact between the electrolyte and the inmost ends of the liquid metal columns 16, 17 the volume of electrolyte solution used may be sufficient to extend somewhat beyond the ends of the plug 20.

In contradistinction to the embodiments shown in FIGS. 1 and 2, the combined volume of the electrolyte solution (including the volume of the porous plug 20) and of the two mercury columns is less than the volume of the bore 18. Thus, there are, in the general case, free spaces 22 and 23 between the outer ends of the columns 16 and 17 and the ends of the bore. The bore is closed at each end by plugs 24 and 25 of wax, plastic, silicate cement or metal or the ends of the tube may be heat-sealed. Prior to closing the ends of the bore the air within the spaces 22, 23 is pumped out to minimize resistance to changes in length of the metal columns. Alternatively, the ends of the tube may be provided with relatively large bulbs filled with inert gas.

Platinum or stainless steel electrodes 26, 27, similar in function to conductive connections or electrodes 7 in FIG. 1, are sealed into the wall of the tube 19 adjacent the opposite ends of the plug 20. These electrodes are used to connect the liquid metal columns 16, 17 to an external source of potential such as a battery 28 and to a utilization device 29.

This embodiment of the invention, as it has been described thus far, may be used in precisely the same way as the instruments shown in FIGS. 1 and 2. It will be noted, however, that here the inmost ends of the two mercury columns 16, 17 are maintained stationary with respect to the tube 19 and the apparent changes in length of the columns occur at the outermost ends of the columns as metal is removed from one column and added to the other column when the utilization device is operating and allows current to pass. Therefore, the outer ends rather than the inner ends of the columns are the moving indicators. Suitable graduating marks may be placed on or adjacent the tube to facilitate accurate reading of the instrument.

The instrument shown in FIG. 3 may be adapted to act as a switch for controlling an external circuit. To accomplish this a pair of electrodes 30 and 31 are introduced through the wall of the tube 19 at spaced locations along the bore 18 on one side or other of the fixed plug 20. These electrodes may be stainless steel, platinum, or any other material which is not soluble in mercury. For purposes of illustration only the electrodes 30 and 31 are shown connected in series with a battery 32 and the actuating coil of a relay 33. Thus, when the mercury column 16 has progressed far enough along the bore 18 so that it is in contact with both of the electrodes 30 and 31 the circuit through the relay coil is completed and the relay is actuated. The useful applications of such a device are numerous and many will immediately occur to those skilled in the art. Obviously, a set of either fixed or adjustable electrodes may be added to cooperate with the mercury column 17.

The effective location of the electrode 30 may be made adjustable so that the length of time required for the mercury column to close the external circuit may be varied at will. To obtain this result it is only necessary to introduce the electrode 30 through the plug 24 in the end of the bore, rather than through the wall of the tube as shown, and to provide suitable means for varying the extent to which the electrode extends lengthwise along the bore. An arrangement of this sort makes it very easy to change the separation between the end of this adjustable electrode and the fixed electrode 31.

The instrument shown in FIG. 3 may also be equipped to function as a time- or current-dependent variable resistance device. As such it may be used in a wide variety of recording and controlling equipment. A resistance element which may be a wire 34, a conductive ribbon, or a resistive coating extends lengthwise of the bore and is fixed to the inner wall of the tube. If it is found useful to make the resistance element longer than the available length of the bore, it may be formed as a helix. A wire 35, which extends through and is sealed into the wall of the tube, is connected to the resistance element at any desired point along its length. This provides means for connecting the resistance element in circuit with a suitable recording or indicating device. Solely for purposes of illustration, the element 34 and wire 35 are shown in circuit with an ohmmeter 36, a source of potential such as battery 37 and the electrode 27. As shown in the drawing, the resistance element 34 and the electrode 27 are not directly connected together, but are connected through the mercury column 17.

It is apparent that as the mercury column becomes longer or shorter it will short out more or less of the length of the resistance wire 34, thereby varying the total resistance in the circuit. The variation in resistance will be reflected in the value indicated by the meter 36 which may be calibrated directly in terms of the length of the column 17 or in terms of any other variable which is related to the length of the column. Resistance elements of the kind described may be used in either or both ends of the bore and may be used alone or in conjunction with the switching circuit described above.

The mechanical stability of the mercury columns in the device shown in FIG. 3 is improved by using a tube having relatively small bores so that good capillary action obtains. Although the electrolyte does not move along the bore in this embodiment, coating the walls of the bore 18 with a hydrophobic polymer is useful to prevent leakage of electrolyte solution around the mercury columns.

In order to take maximum advantage of capillary effects, the porous body used as the plug 20 in FIG. 3 should have fine pores, and it should be thoroughly wetted by the electrolyte solution. This increases the pressure which must be exerted by the mercury before it can penetrate the pores of the plug. Any tendency of the electrolyte solution to wander out of the pores of the plug may be minimized by metallizing the surface only of the plug with gold or platinum, so that mercury wets the metallized surface.

FIG. 4 shows a modification of the embodiment of the invention shown in FIG. 3. Here the body of the instrument consists of two halves 38 and 39. The part 38 is typical and consists essentially of a tube of non-conductive material having a bore 40 therethrough. One end of the tube is provided with an annular flange 41 having a diameter which is substantially greater than the diameter of the bore 40. The face 42 of the flange opposite the tube is coated with platinum or any other material which is both electrically conductive and wettable by liquid metals such as mercury. Preferably, the coating material is insoluble in the liquid metal used. The two halves of the body are arranged with their respective flanges face to face but spaced apart by an assemblage consisting of a pair of annular spacers 43 which are located on opposite sides of a disc-shaped, electrolyte-permeable member 44. The two halves of the body, the spacers and the permeable member are held in assembled relation by headed pins 45 which pass through holes in the flanges. A cylindrical chamber 46 divided into two spaces by the permeable member is thus formed between the body parts 38 and 39. This chamber has a substantially greater cross-sectional area than that of the bore 40.

The permeable member is saturated with electrolyte solution which has the same composition as the solution described in connection with FIG. 1 and a quantity of mercury, indicated at 47, sufficient to fill the chamber space 46 and a portion of the bore on each side of the permeable member 44 is introduced into these spaces. Finally, the end of the bore in each half of the instrument is sealed with a plug 48 of wax, plastic, silicate cement or metal after replacing the air remaining in the bore with an inert gas at relatively low pressure. The gas filled bulbs suggested in connection with the embodiments shown in FIG. 3 may also be used.

The platinum coatings on the faces 42 of the flanges 41 are to insure that the mercury or other liquid metal wets the flanges and is thereby drawn into the innermost recesses of the chamber. The coatings and the wires 49 and 50 connected to them are the means for connecting the mercury columns to the circuit the operation of which is to be timed, for example.

This embodiment of the invention may be used in exactly the same way as the embodiment shown in FIG. 3, and, if desired, may have incorporated in it the electrodes similar to switch electrodes 30 and 31 or a resistance element similar to element 34, both shown in FIG. 3. The distinguishing features of this form of the invention are that it can operate with a larger total current than may be used in a FIG. 3 type of instrument of comparable size and that it provides means for magnifying the response of the instrument. This follows from the fact that the cross-sectional area of the chamber 46 may easily be as much as one hundred times greater than the cross-sectional area of the bore 40. Consequently, a much greater amount of mercury may be transferred through the porous diaphragm in unit time while maintaining the current density, i.e., the amperes per square centimeter of effective diaphragm area, within reasonable limits and the change in length of the columns of mercury in the bore per unit of time will be proportionately greater.

An outstanding feature of all these devices is their complete reversibility. Some coulometric devices have been made for applications similar to those described above, but to the extent that I am acquainted with them they are not reversible and must be discarded after measuring one gross time unit. In contrast, my device can be readily reversed simply by interchanging the connections, or any other convenient means may be provided for changing the direction of the current flow through the device. In either case it may be used many times over, thereby resulting in substantial economies.

This description of these particular embodiments of my invention will immediately suggest to those skilled in the art many different materials and configurations in essentially the same combination. The several forms of the instrument may also be used as current integrating devices in circuits where the current is constant or varying, because the change in lengths of the columns is always the analog of the total electrical charge which has flowed through the columns. For example, these devices may be used as means for integrating a varying electrical signal over long periods of time. Applied in this way they would be especially useful in meteorology for measuring natural evaporation, total sunlight, average temperature, average humidity, etc. A small, lightweight and low-power device according to my invention is especially suitable because it can be used in mobile equipment operating directly from a solar battery, resistance thermometer, thermocouple, or other sensing device. Also, there are many process variables in the laboratory and in industry which must be integrated for interpretation, such as flow, composition, temperature, and pressure. This integration can yield either an average value of a variable, or a total amount of material.

Quite obviously, these new integrators or timers may be used in alternating current circuits by inserting a full-wave or half wave rectifying device in circuit with them.

In view of these and other apparent modifications, I do not intend to be limited to the specific details set forth above. The scope of my invention is defined by the subjoined claims.

I claim:

1. An operating time indicator comprising a body of non-conductive material having a bore of substantially uniform cross-section through the body, said bore having therein two columns of liquid metal, each of which extends from an end of the bore toward the other column such that a space not occupied by column metal exists between the adjacent ends of said columns, a liquid electrolyte in said bore and in contact with the inmost ends of the columns and filling said space between the adjacent ends of said columns, said electrolyte comprising principally a solution of at least one soluble salt of said metal, and conductive means for connecting said columns to an external source of potential, whereby, upon impressing a potential between said columns, metal is removed from one of said columns and transported through said electrolyte and deposited on the other of said columns, the change of length of said columns being directly indicative of the quantity of electric charge flowing through said indicator.

2. An operating time indicator comprising a body of non-conductive material having a bore of substantially uniform cross-section therein, said bore having a diameter equal to or less than three milimeters, a first column of liquid metal extending from one end of said bore toward the other end, a second column of liquid metal extending from the other end of the bore toward said one end, a liquid electrolyte in said bore and in contact with the inmost ends of said columns of liquid metal, said electrolyte comprising principally a solution of at least one soluble salt of said metal, the metal of the columns and the electrolyte substantially filling said bore, and conductive means for connecting said columns to an external source of potential, whereby, upon impressing a potential between said columns, metal is removed from one of said columns and transported through said electrolyte and deposited on the other of said columns, the change of length of said columns being directly indicative of the quantity of electric charge flowing through said indicator.

3. An electrical current meter comprising a tube of transparent, electrical insulating material, said tube having therein a bore of uniform diameter throughout its length, said diameter being equal to or less than three millimeters, an anode column of mercury filling the cross-section of said bore and extending from one end of said bore for a distance which is less than the length thereof, a cathode column of mercury filling the cross-section of said bore and extending from the other end of said bore for a distance which is less than the length of that portion of the bore which is unfilled by the anode column by an amount which is substantially equal to one to three times the diameter of the bore, an electrolyte in said bore between and in contact with the adjacent ends of said anode and cathode columns, said electrolyte comprising a water solution of potassium iodide and mercuric iodide, means for sealing the ends of said bore so that the electrolyte solution and the mercury columns together fill the entire bore, means for connecting said columns to a source of direct current potential, and a series of scale marks in proximity to said bore, wherein passage of current through the columns of mercury and the electrolyte causes mercury to be removed from the end of one column and deposited on the adjacent end of the other column with resultant motion of the whole of the electrolyte solution along the bore, the extent of the motion of the electrolyte solution being a direct measure of the product of the current flowing through the columns and the time during which the current flows.

4. A coulometer comprising a body having a bore of substantially uniform cross-section through the body, a permeable member fixed in said bore intermediate the ends thereof, an electrolyte permeating said member, columns of liquid metal extending along said bore in opposite directions from said member, said electrolyte comprising principally a solution of at least one soluble salt of said metals, the inmost ends of the columns being in conductive contact with the electrolyte solution, and conductive means for connecting said columns to an external source of potential, whereby, upon impressing a potential between said columns, metal is removed from one of said columns and transported through said electrolyte and deposited on the other of said columns, the change of length of said columns being directly indicative of the quantity of electric charge flowing through said indicator.

5. An operating time indicator and electric circuit switching device comprising a body having a bore of substantially uniform cross-section through the body, a permeable member fixed in said bore intermediate the ends thereof, an electrolyte solution permeating said member, columns of liquid metal extending along said bore in opposite directions from said member, the inmost ends of the columns being in conductive contact with the electrolyte solution, conductive means for connecting said columns to an external source of potential, and at least two conductive contact members in said bore adapted to contact one of said columns at spaced locations along that column, and means for connecting said contact members in an external circuit, wherein passage of current from an external source through the columns of mercury and the electrolyte causes mercury to be removed from the inmost end of one column and deposited on the inmost end of the other column with resultant shortening of the one column and lengthening of the other column, and the resultant change in length of a column making or breaking a conductive path between said spaced contact members.

6. An operating time indicator and electric circuit switching device according to claim 5 in which said bore has a diameter not greater than three millimeters.

7. An operating time indicator electric circuit switching device according to claim 5 in which the liquid metal of the columns is mercury and the electrolyte solution is a water solution of potassium iodide and mercuric iodide.

8. An operating time indicator and electric circuit potentiometer comprising a body having a bore of substantially uniform cross-section through the body, a permeable member fixed in said bore intermediate the ends thereof, an electrolyte solution permeating said member, columns of liquid metal extending along said bore in opposite directions from said member, the inmost ends of the columns being in conductive contact with the electrolyte solution, conductive means for connecting said columns to an external source of potential, a conductive contact member extending into said bore and adapted to contact one of said columns at a location relatively close to said permeable member, a resistive member fixed to and extending along the wall of the bore and adapted to be contacted along varying portions of its length by said one column as the length of the column changes, and means for connecting said contact member and said resistive member in an external circuit, wherein passage of current from an external source through the columns of mercury and the electrolyte causes mercury to be removed from the inmost end of one column and deposited on the inmost end of the other column with resultant shortening of the one column and lengthening of the other column, and the change in length of said one column results in a change of the effective length of the resistance element connected in the external circuit.

9. An operating time indicator comprising a body of non-conductive material having a bore of substantially uniform cross-section through the body, said bore having therein two columns of liquid metal, each of which columns extends from one end of the bore toward the other column, an electrolyte in said bore between said columns and in good electrical contact with the inmost ends of the columns, said electrolyte consisting principally of a solution of at least one soluble salt of said metal, an electrolyte permeable body of non-conductive material in said electrolyte, said free body being shaped and proportioned such that it is freely movable along said bore and that no passage therethrough and therearound has a cross-section the maximum dimension of which is greater than three millimeters, and conductive means for connecting said columns to an external source of potential, whereby, upon application of a potential between said columns, liquid metal is removed from one of said columns and transported through said electrolyte and deposited on the other of said columns and the electrolyte and the permeable body therein is displaced along said bore.

10. An operating time indicator according to claim 9 in which the permeable body of material is a length of glass tube, the internal diameter of which is not greater than three millimeters and the outside diameter of which is slightly less than the diameter of the bore.

11. An operating time indicator according to claim 9 in which the permeable body of material is composed of porous sintered glass.

12. An operating time indicator comprising a body having a bore of substantially uniform cross-section through the body, said body also having a chamber therein intermediate the ends of said bore and in communication therewith, the diameter of said chamber being substantially greater than the diameter of the bore, a permeable member fixed in said chamber and extending across the entire cross-section of said chamber to effectively divide the chamber and the portions of said bore on opposite sides of the permeable member into two separate spaces, an electrolyte solution permeating said member, liquid metal filling the portions of the chamber on opposite sides of said member and extending from the portions of the chamber into the bore, the liquid metal being in conductive contact with the electrolyte solution in the member, and conductive means for connecting the liquid metal on each side of the member in circuit with an external source of potential.

13. An operating time indicator according to claim 12 in which the liquid metal is mercury and the electrolyte solution is a water solution of potassium iodide and mercuric iodide.

14. An operating time indicator according to claim 12 in which the diameter of the bore is less than approximately three millimeters and in which the interior surfaces of said chamber consist of a substance which is wettable by the liquid metal.

15. An operating time indicator for electric circuits, which indicator comprises a body of non-conductive material having a bore therethrough, a first column of a liquid metal in one section of said bore and a second column of the liquid metal in another section of said bore, and a volume of liquid electrolyte in said bore confined between the adjacent ends of said columns of liquid metal, said electrolyte consisting of a solution of a soluble salt of said liquid metal, both of said columns of metal having longitudinal portions thereof which have substantially uniform cross-sections throughout the length of said portions, said longitudinal portions of said columns filling the cross-sections of their respective sections of said bore, and conductive means for connecting said columns to an external source of potential, whereby, upon impressing a potential between said columns, metal is removed from one of said columns and transported through said electrolyte and deposited on the other of said columns, the change of length of said columns being directly indicative of the length of time a predetermined charge flows through said indicator.

16. An operating time indicator according to claim 15 and in which the longitudinal portions of said columns having substantially uniform cross-section have diameters equal to or less than three millimeters.

17. An operating time indicator according to claim 15 in which said liquid metal is mercury and said electrolyte comprises a solution of at least one soluble salt of mercury.

References Cited in the file of this patent

UNITED STATES PATENTS

| | | |
|---|---|---|
| Re. 24,190 | Kroko | July 31, 1956 |
| 702,844 | Wright | June 17, 1902 |
| 702,848 | Wright | June 17, 1902 |
| 925,064 | Whitney | June 15, 1909 |
| 1,590,451 | Slepian | June 29, 1926 |
| 2,327,833 | Warner | Aug. 24, 1943 |

FOREIGN PATENTS

| | | |
|---|---|---|
| 484,473 | Germany | Oct. 17, 1929 |
| 827,461 | Germany | Sept. 29, 1955 |
| 958,036 | Germany | Feb. 14, 1957 |

OTHER REFERENCES

Delahay: New Instrumental Methods in Electrochemistry, page 351.

UNITED STATES PATENT OFFICE
CERTIFICATE OF CORRECTION

Patent No. 3,045,178            July 17, 1962

Lester Corrsin

It is hereby certified that error appears in the above numbered patent requiring correction and that the said Letters Patent should read as corrected below.

Column 9, lines 73 and 74, and column 10, line 32, for "mercury", each occurrence, read -- liquid metal --.

Signed and sealed this 21st day of May 1963.

(SEAL)
Attest:

ERNEST W. SWIDER
Attesting Officer

DAVID L. LADD
Commissioner of Patents